United States Patent
Sharma et al.

(10) Patent No.: US 6,412,046 B1
(45) Date of Patent: Jun. 25, 2002

(54) VERIFICATION OF CACHE PREFETCH MECHANISM

(75) Inventors: Debendra Das Sharma, Santa Clara; Kevin Hauck, Sunnyvale; Daniel F. Li, Saratoga, all of CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/562,130

(22) Filed: May 1, 2000

(51) Int. Cl.[7] .................. G06F 12/00; G06F 15/00; G06F 9/30; H02H 3/05

(52) U.S. Cl. .............. 711/137; 711/204; 712/207; 714/32; 714/36

(58) Field of Search ................... 711/204, 214, 711/137; 712/207, 233–239; 714/32, 36; 699/703, 742, 799

(56) References Cited

U.S. PATENT DOCUMENTS 5,386,521 A  1/1995  Saitoh .................. 395/375

FOREIGN PATENT DOCUMENTS

EP  0370926 A2  5/1990  .......... G06F/11/22

*Primary Examiner*—Do Hyun Yoo
*Assistant Examiner*—Kimberly N. McLean (57) ABSTRACT

A method and apparatus automatically and easily verifies a cache line prefetch mechanism. The verification method includes a strict definition of which cache lines should be prefetched and which cache lines should not. The method also emphasizes unusual operating conditions. For example, by exercising boundary conditions, the method by stresses situations in which a microprocessor or chip is likely to produce errors. The method can verify prefetch without having to access or view any internal signals or buses inside the chip. The method can be adopted in any system-level verification methodology in simulation, emulation, or actual hardware. The method can be used in a system-level test set up along with a chip-level test set up without requiring knowledge of the internal state of the chip. In this case, checking is done at the chip boundary. The method is automated and performs strict checks on overprefetch, underprefetch, and the relative order in which fetch and prefetches must occur.

16 Claims, 6 Drawing Sheets

VERIFICATION OF CACHE PREFETCH MECHANISM

TECHNICAL FIELD

The technical field is computer memory systems using cache prefetch mechanisms.

BACKGROUND OF THE INVENTION

An agent, such as a processor or a host I/O bridge, in a computer system may need to access or read one or more cache lines from the computer system's main memory. These lines are normally written to a cache, and the corresponding cache lines are accessed by the agent. Fetching lines from the main memory, writing them to the cache, and then accessing the cache lines imposes a delay known as memory latency. Modem computer systems use prefetch mechanisms to hide this memory latency. A cache controller may prefetch one or more cache lines either speculatively or explicitly based on a hint or other alerting mechanism. When a cache line is requested without the requesting agent taking ownership of the cache line (i.e., a snapshot), prefetching may only occur based on explicit hints. The cache line then maybe discarded after use to make sure that a stale copy of the cache line is not retained in the cache.

As with any mechanism in a computer system, a designer wants to ensure the prefetch mechanism is functioning as designed. Verifying prefetch involves making sure that the cache does not overprefetch or underprefetch. Overprefetching occurs when the cache controller requests one or more cache lines beyond That is desired. Such overprefetching may occur as a result of a design defect. For example, a cache line size may comprise 64 bytes. In this example, the prefetch mechanism is intended to prefetch four cache lines ahead (i.e., the prefetch depth is four) but the prefetch mechanism is designed not to prefetch memory lines beyond a four kilobyte block boundary of the main memory. If an agent starts consuming cache lines at address 0, the cache controller fetches address 0 and prefetches for the next four cache lines at addresses 0x40, 0x80, 0xC0, and 0x100. When the agent then starts consuming from cache line 0x40, the cache controller will prefetch the cache line 0x140, assuming the cache lines 0x80, 0xC0, and 0x100 are present in the cache from the previous prefetch. If the cache controller prefetches the next cache line 0x180, or any other cache line beyond 0x140 when the agent is consuming the cache line 0x40, the cache controller is said to have overprefetched. In this example, the cache controller has violated the prefetch depth by prefetching beyond the desired prefetch depth (i.e., prefetched beyond the desired prefetch of four cache lines). Overprefetching can also occur if a block boundary is exceeded. Continuing with the example, if the agent started reading from the cache line 0xF00, and the cache controller prefetched the line 0x1000, which is four lines ahead of 0xF00, the boundary restriction would be violated since no prefetching is desired if such prefetching crosses the current four kilobyte page boundary.

Overprefetching has two disadvantages: performance, and if data is requested as a snapshot (or will be converted to a snapshot due to a snoop), then correctness. Performance is adversely affected since cache lines may be fetched that are not immediately needed and may never be used in the present processing stream, causing loss in bandwidth and reduction of available space in the cache. In the case of snapshots, the prefetches are not speculative. Thus, if the explicit hints are violated and prefetching occurs beyond the prefetch depth, stale data may be retained in the cache. This stale data may be given to some other requesting agent and may cause data corruption.

Underprefetch may occur when the cache controller prefetches less than what the cache controller could prefetch. For example, if an agent is reading from cache line 0x0 and the cache controller prefetches only lines 0x40, 0x80, and 0xC0, without prefetching line 0x100, and without having any internal or external cause that prevented prefetching line 0x100, then an underprefetch condition exists. A cache controller may not prefetch a line due to a number of circumstances, including the cache being full or almost full, or some other flow-control condition. The cache controller, however, may resume prefetch when these conditions clear. Prefetch may also be validly terminated if another request stream is provided along the same channel. The potential consequence of underprefetch is performance. A cache line may not be present in a cache when a requesting agent needs the cache line because the cache controller has underprefetched.

Existing schemes to insure that prefetch is working as desired rely on human observation. A prefetch verification mechanism may involve viewing a simulation trace and determining if the cache is prefetching adequately. Other approaches involve looking at cache/system performance from a simulation. If the prefetch performance is not optimum, then prefetch may be checked manually as a potential cause. The disadvantage of this approach is that it is not automated and does not insure proper prefetching under all operating (traffic) conditions. In particular, if a design is changed after the prefetch mechanism is originally verified to be operating properly, a subsequent prefetch verification maybe impossible. In cases where an agent obtains a cache line without ownership (i.e., snapshot) the designer may rely on normal data consistency checks to detect any prefetch problems. However, in many cases, stale data (cache lines) may not remain in the cache long enough for another request stream (i.e., a request from another agent) to obtain the stale data In this case, the improper prefetch would go undetected. Other approaches for verifying proper prefetch include simulating state machines to operate in parallel using a programming language such as C and then comparing the results on a cycle-by-cycle basis. The disadvantage is that such a metachecker is difficult to write and has to be constantly modified along with the overall design. In this case, the metachecker may fail to detect improper prefetch under some operating conditions.

SUMMARY OF THE INVENTION

A method and apparatus is provided that automatically and easily verifies a cache line prefetch mechanism. The verification method is exact in the sense that the method includes a strict definition of which cache lines should be prefetched and which cache lines should not be prefetched. The method also emphasizes comer-case operating conditions. For example, by exercising boundary conditions, the method by stresses situations in which a microprocessor or host bridge chip is likely to produce errors. The method can verify prefetch without having to access or view any internal signals or buses inside the chip. Thus, the method can be adopted in any system-level verification methodology.

The method can be used in a system-level test set up along with a chip-level test set up without requiring knowledge of the internal state of the chip. In this case, checking is done at the chip boundary. The method is automated and performs strict checks on overprefetch, underprefetch, and the relative order in which fetch and prefetches must occur. The method may be executed in a simulation, an emulator, or in actual hardware.

DESCRIPTION OF THE DRAWINGS

The detailed description will refer to the following drawings in which like numerals refer to like objects, and in which.

DETAILED DESCRIPTION

An agent in a computer system may send a request to access data from the computer system's man memory. The data maybe cached to improve access time forthe agent. To further minimize memory latency, a cache controller, operating in accordance with appropriate software, may prefetch additional lines and store these additional lines in the cache in anticipation of the agent requesting the additional lines. The number of additional lines cached for the agent's request may determined by two quantities, a prefetch depth and a block boundary. The prefetch depth refers to the number of cache lines beyond the current cache line being read that the cache controller will request. The prefetch depth maybe four cache lines, for example. This means that the cache controller will attempt to maintain four cache lines beyond the currently-read cache line in the cache. If the cache controller originally stores cache lines 0–4, and the agent reads cache line 1, then the cache controller will attempt to fill cache line 5 with the next sequential address line form the main memory. The block boundary refers to a boundary within the memory region beyond which the cache controller will not request address lines, even if the prefetch depth limit has not been reached. For example, the block boundary may be the 4 kilobyte boundary next to the initial address in the main memory. If the cache controller does not prefetch the four lines (absent some other condition such as proximity to the block boundary), an underprefetch condition exists, with a negative affect on performance of excessive memory latency. If the cache controller prefetches more than the designed prefetch depth, the extra cache lines may cause the limited capacity cache to fill unnecessarily, leading to stalls and other performance problems. Finally, any prefetch beyond the designated block boundary indicates an improper operation of the prefetch mechanism.

To verify proper prefetch, a method involves allocating a region in main memory that is not used by an agent in a computer system. The memory region is then used to verify prefetch for one agent. The memory region may include one or more memory lines beyond an intended block boundary. For example, if the intended block boundary is 4 kilobytes and the starting address in 0x0, then the memory region should include one or more lines beyond 0x1000. The method may be executed in a simulator, an emulator, or in actual hardware.

The agent is assigned to read addresses in the memory region in a contiguous and increasing fashion. The number of extra lines a cache controller has to prefetch are calculated when the agent's request stream block size and prefetch depth are assigned. The assignment of block size and prefetch depth is made for every access stream by software, and may be updated for subsequent access streams. These parameters may be determined based on characteristics of the agent, such as its clock speed, the type of application, the number of cache lines normally required to execute the application, and other factors.

The method verifies that the cache does not prefetch any cache line beyond the computed maximum prefetch limit. That is, the method checks that no cache lines are requested beyond the block boundary, which may be the 4 kilobyte boundary, for example. The method also checks to see that no cache lines are requested beyond the prefetch depth. If the cache requests any cache line beyond the maximum prefetch limit, an error is flagged. As noted above, the memory region includes address lines beyond the prefetch block boundary or the maximum prefetchable depth, whichever is the allowable prefetch limit. The cache lines that should not be accessed or stored in a data structure and looked up by a system level checker to ensure that the cache line does not request any line from an area outside the memory region. Since the memory region is assigned to only one agent, this check may be made directly. Tests are generated such that the agent requests cache lines around, up to, and across a block boundary. Thus the method can be used to verify that the cache does not overprefetch, and that any prefetch is limited to address lines within the established block boundary as well as the prefetch depth boundary. The check also verifies that requests for cache lines from the memory region come in a strictly increasing order unless the fetch and prefetch state machines are out of synchronization. In this case, the prefetches (and fetches) can be checked to ensure that they occur in increasing order.

To implement the method, a microprocessor or chip provides two bits of information that can be sent in spare or bit locations of a request. The first piece of information is whether the request is a fetch or a prefetch. The second piece of information is if the current request terminates a previous prefetch stream. The method verifies that all cache lines that are not read by the agent but that lie within the prefetch depth (taking into account the prefetch block boundary restriction, if applicable) are requested by the cache unless terminated by a subsequent request stream. This checks for the underprefetch situation.

These three checks perform a rigorous check that ensure the cache does not have underprefetch or overprefetch problems. Once the prefetch checking for a memory region is completed, that memory region may be reused for other purposes provided the cache relinquishes ownership of all lines in the memory region. Prefetch checking is said to be complete when all the read requests associated with the memory region are completed and when all the lines that are supposed to be prefetched are either prefetched or a subsequent stream supercedes the previous prefetch stream for the region.

Figure 1:
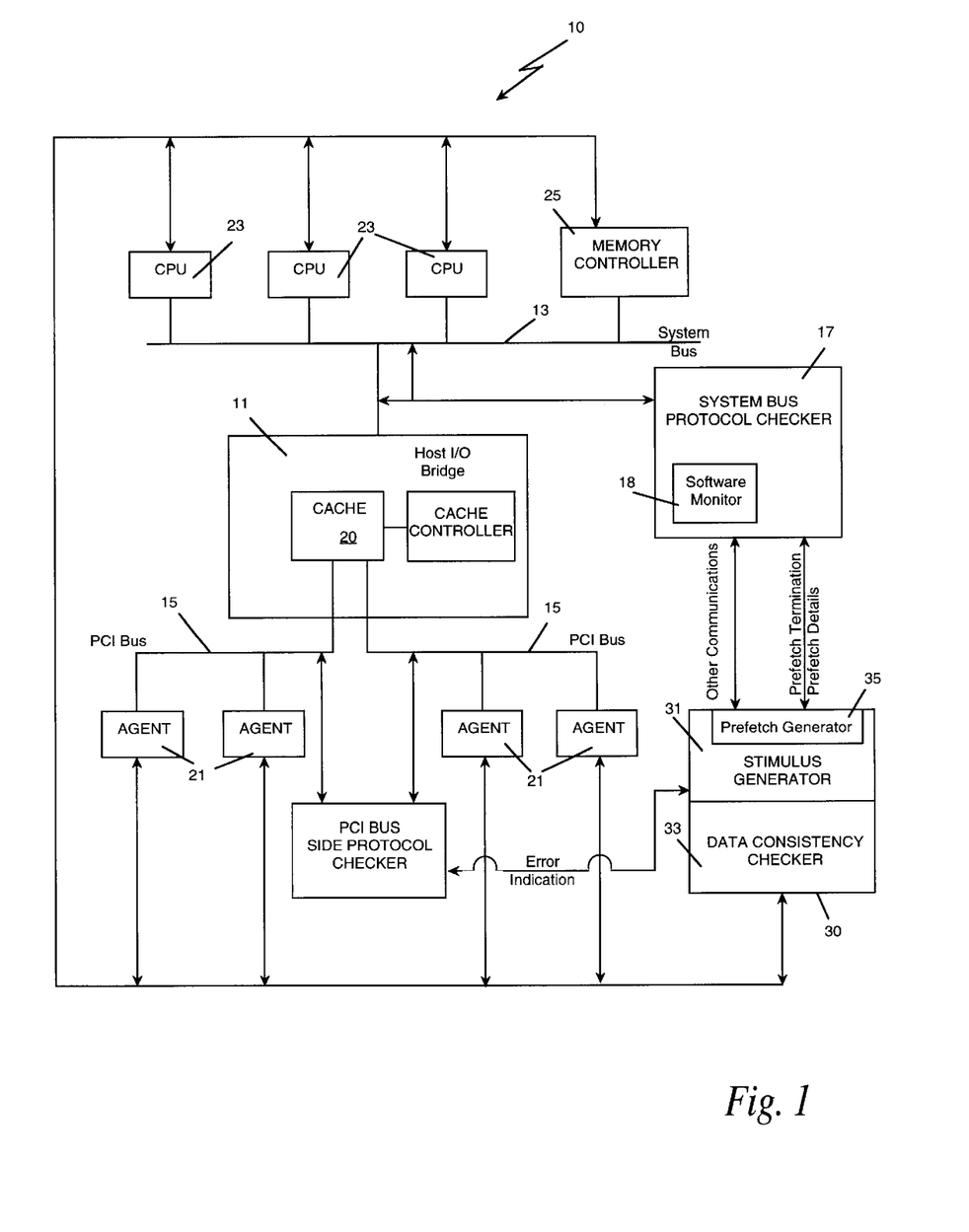
FIG. 1 is a diagram of a computer architecture using a prefetch mechanism.

The prefetch mechanism verification may be explained in greater detail with reference to FIG. 1 which shows a computer architecture 10 that includes a prefetch mechanism. The architecture 10 includes a host input/output (I/O) bridge 11 connecting a system bus 13 and PCI buses 15. Coupled to the PCI buses 15 are agents 21. Coupled to the system bus 13 are CPUs 23 and memory controller 25. The I/O bridge 11 includes a cache 20 and a cache controller 22. In operation, any of the agents 21 may send a request stream for lines in memory controlled by the memory controller 25. The cache 20 will attempt to prefetch a specified number of lines from the memory region so that data in the memory lines may be made available without excessive latency. The prefetch depth and block boundary for each of the agents 21 may be provided to the cache controller 22 by the agents 21 when the agents initiate the request stream.

To ensure the cache 20 does not overprefetch or underprefetch, the architecture 10 may be tested using the method generally described above. That is, a designer or test coordinator may implement a software routine that designates an unused memory region having a block boundary that corresponds to the desired block boundary for a particular agent 21. The test may then be started by having the agent initiate a request stream. The request stream may include additional bits that specify the prefetch depth and block boundary. The test proceed from reading a first address line until all read requests associated with the memory region are completed for the agent 21.

A system bus protocol checker 17, which includes a software monitor 18, provides the necessary control and indication of the prefetch verification. A central generator/checker module 30, which includes a data consistency checker 33, a stimulus generator 31 and a prefetch generator 35, provides for generation of the prefetch. Finally, a PCI bus protocol checker 40 is used for error indications. The prefetch generator 35 works with the stimulus generator 31 to implement the proposed verification strategy and assign the agent(s) to prefetch their allotted regions. The prefetch generator 35 also provides details about the prefetch generation region address and the lines to be requested by the agent 21 or the CPU 23.

Figure 2:
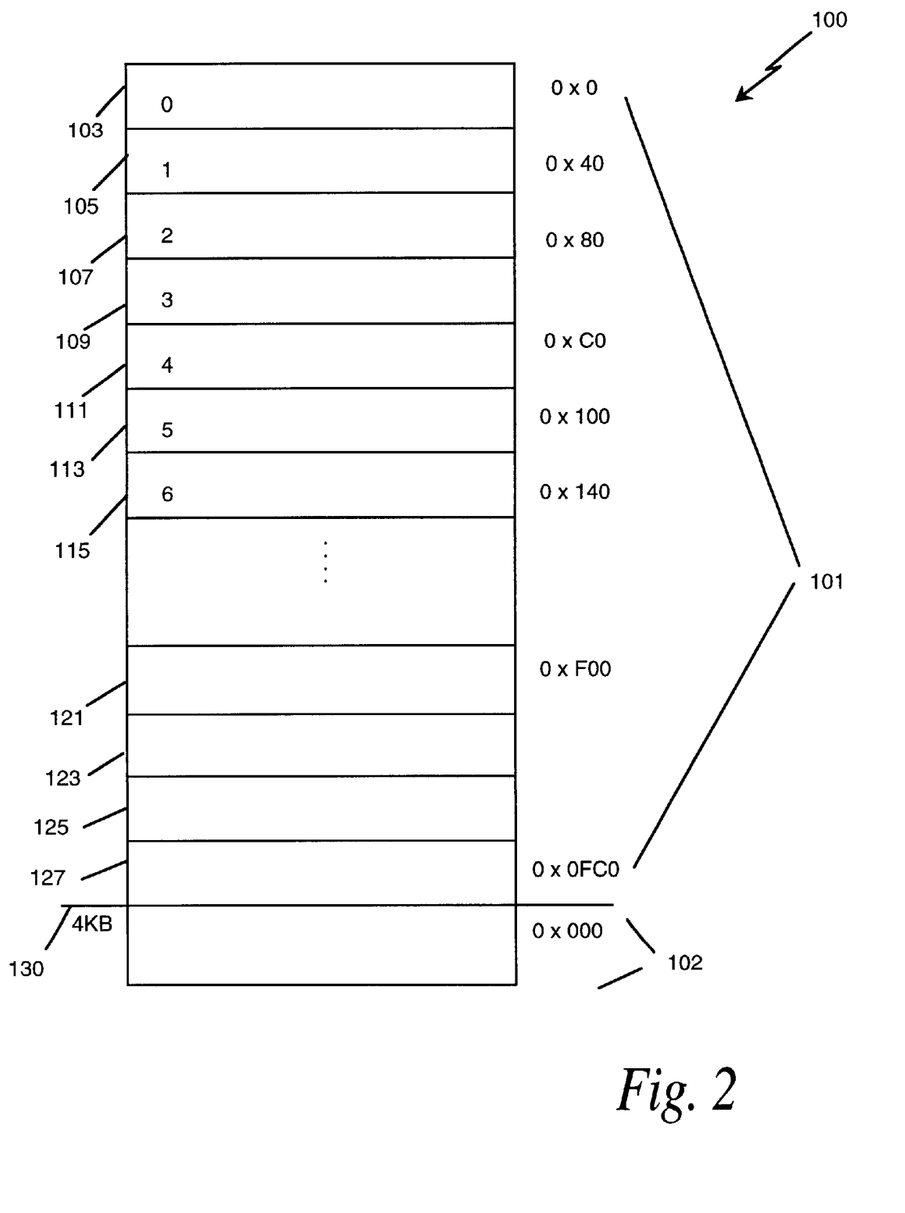
FIG. 2 is a diagram of the memory region illustrating the prefetch verification mechanism.

FIG. 2 shows a memory region 100 that may be designated for use with the prefetch mechanism verification. The memory region 100 includes a block limit 101 and a section 102 outside the boundary of the block limit 101. The block limit 101 is shown as 4 KB. However, block section 101 may be larger or smaller than 4 kilobytes. The section 101 includes memory lines 103–127 corresponding to memory addresses 0x0 through 0x0FC0 (i.e., a 4 kilobyte memory block). Section 102 is large enough to allow adequate verification of the prefetch mechanism. In the example shown in FIG. 2, the section 102 includes one memory line 130. Additional memory lines could be added to the section 102 as required to verify the prefetch mechanism.

Use of the memory region 100 will be explained by way of an example. In the example, the cache designer decides to check cache prefetch by having an agent, such as an agent 21 shown in FIG. 1, perform a direct memory access (DMA) from addresses 0xff0000C0 to 0xff000300 (64-byte cache lines) with a prefetch depth of 4 and a block size boundary of 1 KB. Although the prefetch depth of 4 may lead the cache controller 22 to prefetch the cache line 0xff000400, which is four cache lines ahead of the last line consumed (0xff000300), the block size boundary puts a restriction on prefetch that limits the prefetch and prevents prefetching of the line 0xff000400. In this example, the cache should only prefetch three cache lines beyond the last cache line for which the read is pending. The memory region in this case should be at least the cache lines 0xff0000C0–0xff000400. If the cache requested the line 0xff000400, an error is flagged for overprefetch. If the cache did not request any of the lines 0xff000340, 0xff000380, or 0xff0003C0 and a new subsequent fetch request for the same agent does not indicate the prior prefetch stream was terminated, an underprefetch error is flagged.

In a second example, a prefetch check may involve two agents 21 coupled to the same cache 20 requesting the same memory region simultaneously. The two agents 21 may have different prefetch depth and block sizes. In this example, the prefetch verification involves an either/or decision between the two agents 21. The overprefetch check involves checking for the high of the cache lines between the two agents 21. The underprefetch check checks that a line is fetchable/prefetchable by either agent 21 if it is requested, unless terminated by a subsequent request stream.

FIGS. 3–6 are flow charts illustrating processes for verifying a cache prefetch mechanism. The process operates on the architecture 10 shown in FIG. 1. Alternatively, the process may operate on a simulation of the architecture 10.

Figure 3:
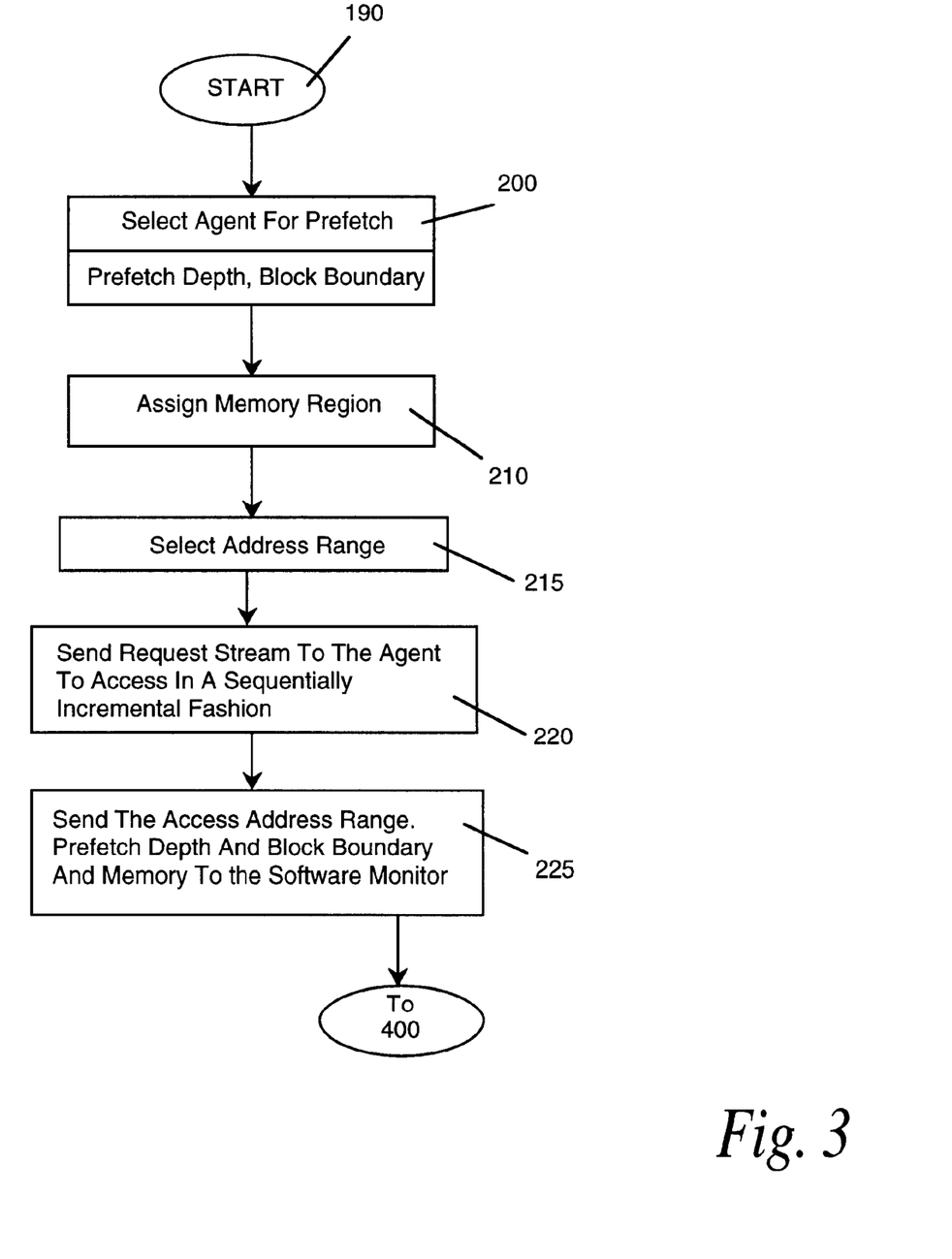
FIGS. 3–6 are a flow charts of processes executed on the architecture of FIG. 1.

FIG. 3 is a flow chart illustrating production of a fetch/prefetch. The process starts at block 190. The stimulus generator 31 chooses one of the agents 21 or the CPU with which to perform the prefetch mechanism verification process, block 200. The agent 21 or the CPU 23 may specify a prefetch depth and a block boundary. Alternatively, these parameters may be assigned by the prefetch generator 35.

The test designer may assign a memory region for verifyng the prefetch mechanism, to the prefetch generator 35, block 210, if such memory region has not already been determined. The memory region boundaries should be chosen so as to encompass the block boundary determined in block 200, and at least one cache line beyond the maximum allowable prefetch limit.

The prefetch generator 35 then selects an address range that should access the memory region, block 215. In block 220, the request stream is sent to the agent to access in a sequentially incremental manner. In block 225, the access address range, prefetch depth, and block boundary are sent to the software monitor 18. The process then continues with block 400 (FIG. 4).

Figure 4:
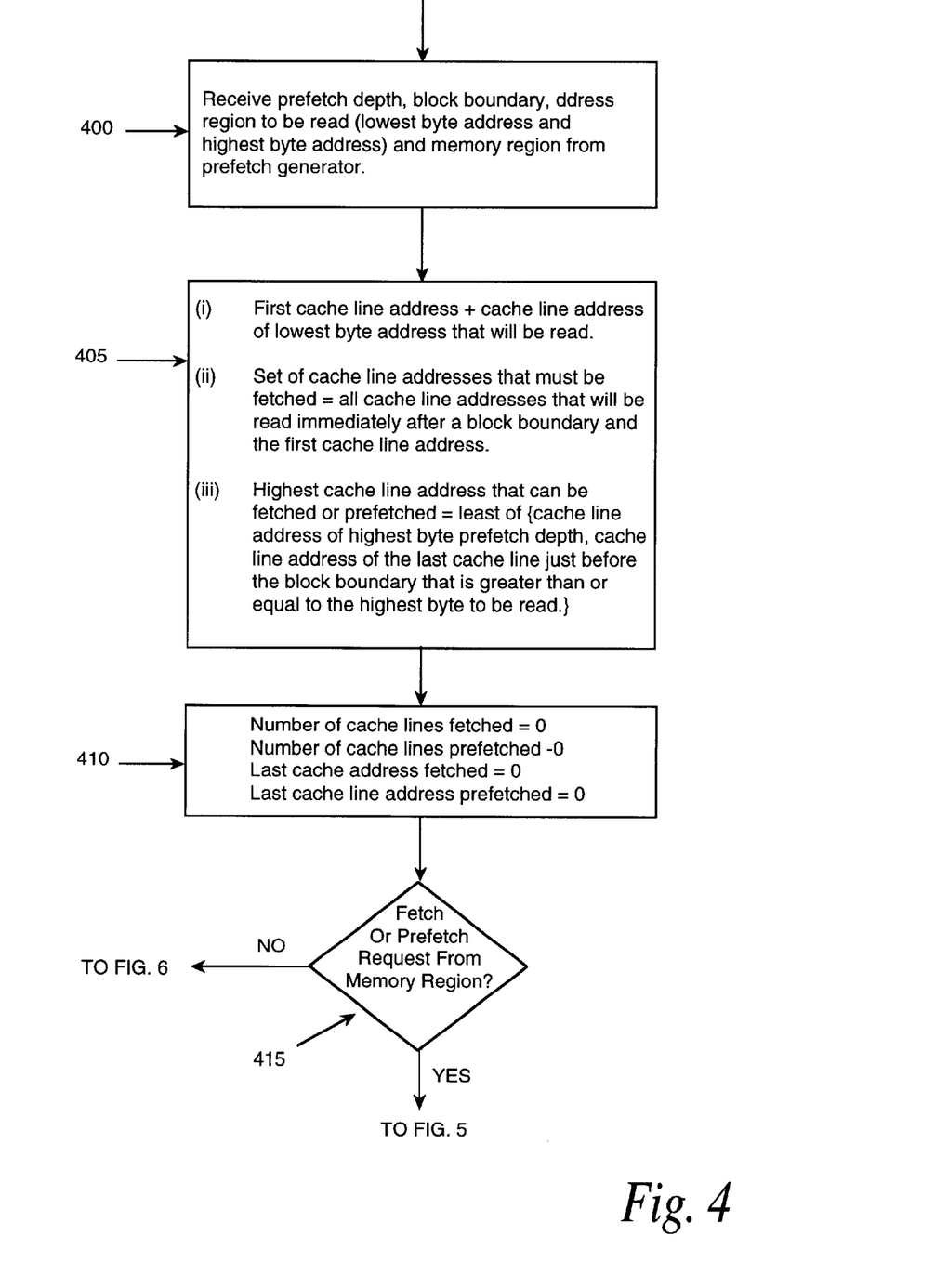

FIG. 4 is a flow chart illustrating a fer process for verifying a cache prefetch mechanism. The process starts at block 400, with the agent 21 or CPU 23 receiving the prefetch depth, block boundary, address region to be read (lowest byte address and highest byte address) and memory region from the prefetch generator 35.

In block 405, the first cache line address is set equal to the cache line address of the lowest byte address that will be read. The set of cache line addresses that must be fetched is set equal to all cache line addresses that will be read immediately after a block boundary and the first cache line address. The highest cache line address that can be fetched or prefetched is set equal to the least line address of the highest byte address to be read plus the prefetch depth, and the cache line address of the last cache line just before the block boundary that is greater than or equal to the highest byte to be read.

In block 410, the number of cache lines fetched, the number of cache lines prefetched, the last cache address prefetched, and the last cache line address prefetched are set to zero.

In block 415, the software monitor 18 checks if the fetch/prefetch are checked to determine if is from the memory regions. If from the memory region, the process continues to the routine illustrated in FIG. 5. Otherwise, the process continues to the routine shown in FIG. 6.

Figure 5:
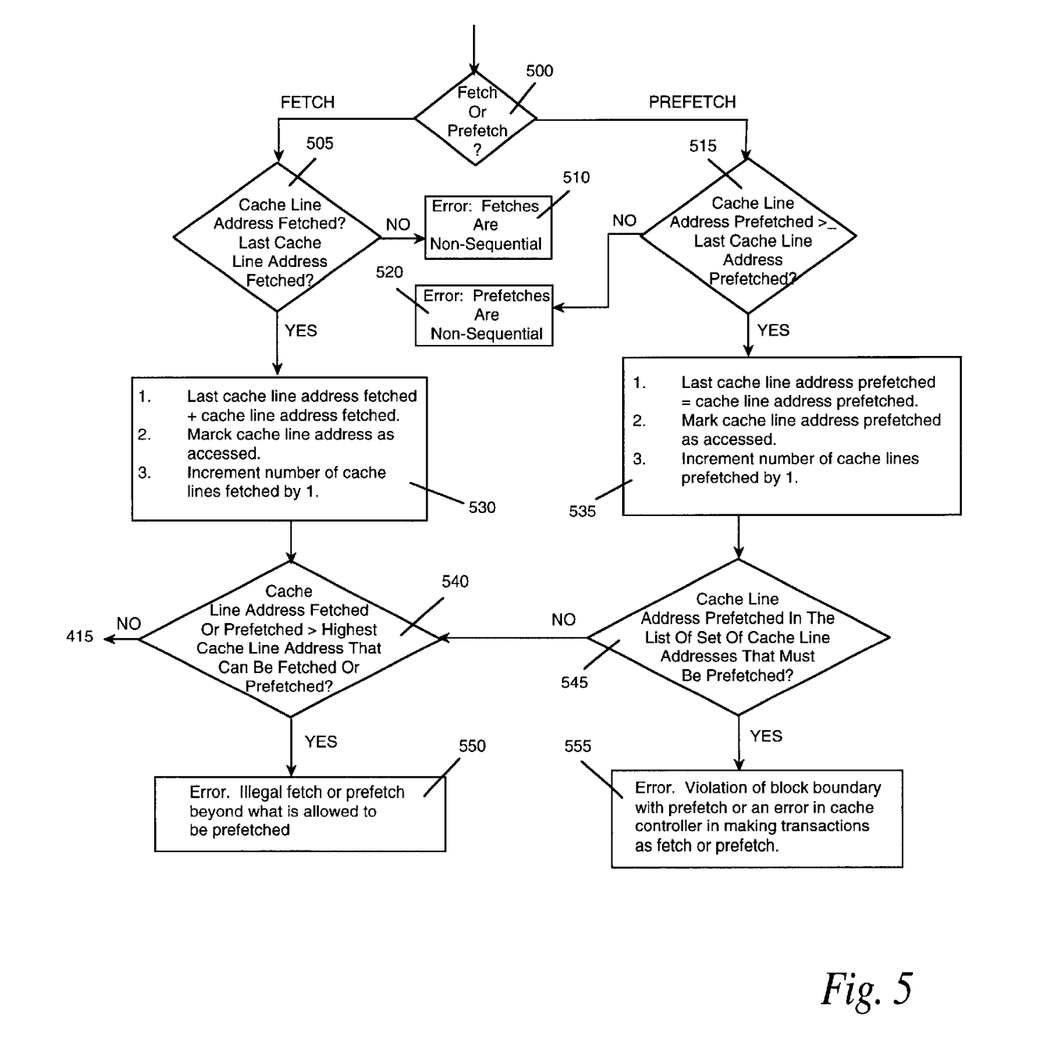

FIG. 5 is a flow chart illustrating finder processes for verifying the cache prefetch mechanism. The process begins at block 500, where the request is checked to be either a fetch or a prefetch. If the request is a fetch, the process moves to block 505 and the cache line address prefetched is checked to determine if it equals or exceeds the last cache line address fetched. If it does equal or exceed the last cache line fetched, the process moves to block 530, where the last cache line address fetched is set equal to the cache line address fetched, and the cache line address is marked as accessed. In addition, the number of cache lines fetched is incremented by 1.

In block 540, the cache line address fetched or prefetched is checked to see if greater than the highest cache line address that can be fetched or prefetched. If not greater, the processing returns to block 415 (FIG. 4). If greater, the process moves to block 550.

In block 550, an error flag is set for a fetch or prefetch beyond what is allowed to be prefetched.

In block 505, if the cache line address fetched is less than the last cache line address fetched, the process moves to block 510, and an error flag is set for non-sequential fetches.

In block 500, if the transaction is a prefetch, the process moves to block 515, and the cache line address prefetched is checked to see if greater than or equal to the last cache line address prefetched. If not greater, the process moves to block 520, and an error flag is set. If greater than or equal, the process moves to block 535, where the last cache line address prefetched is set equal to the cache line address prefetched, the cache line address is marked as accessed, and the cache lines accessed is incremented.

In block 545, the cache line address prefetched in the list of sets of cache line addresses is checked to see if it must be fetched. If it is not to be prefetched, the process returns to block 540. Otherwise, the process moves to block 555, an error condition is noted from a violation of the block boundary with prefetch, or an error in the cache controller on marking transactions as fetch or prefetch.

Figure 6:
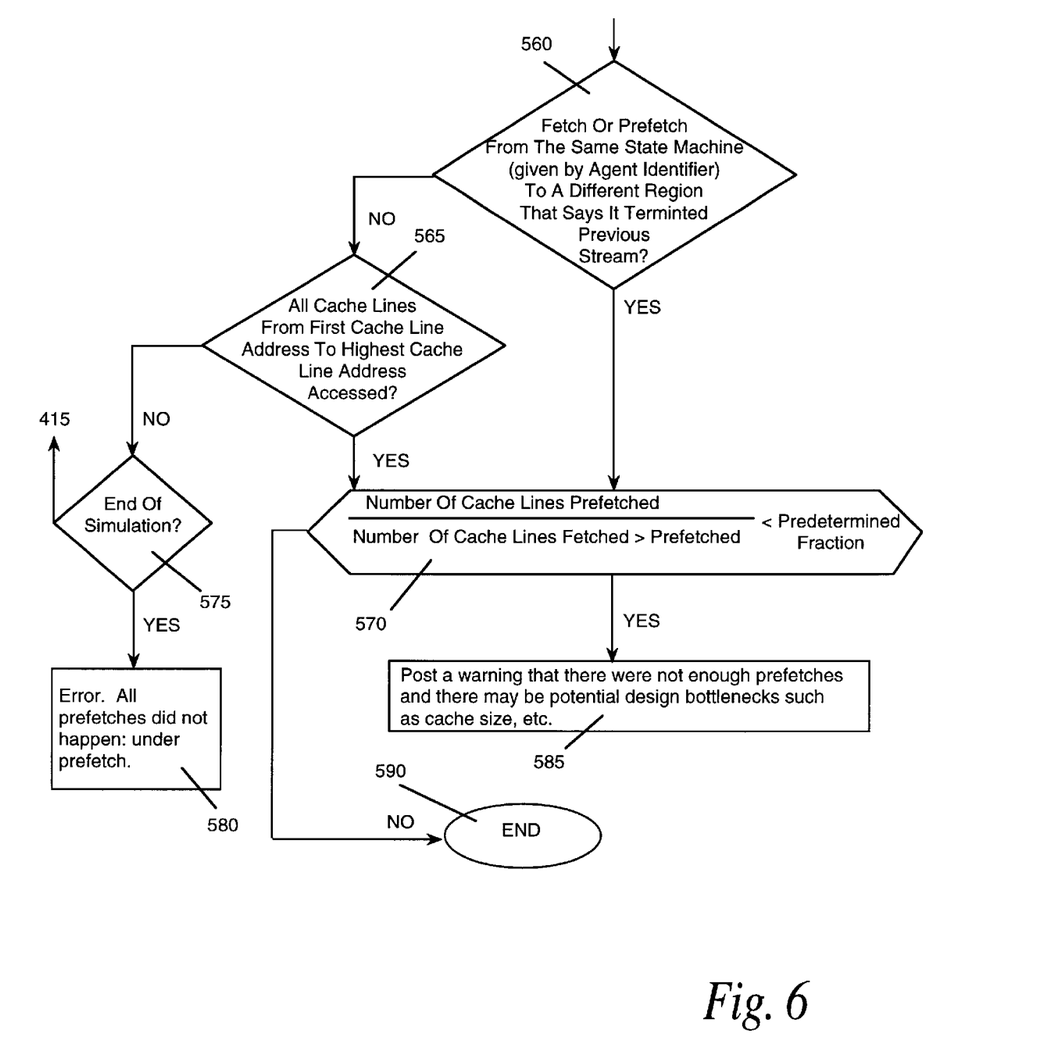

In FIG. 6, at block 560, the fetch or prefetch from the same state machine (given an agent identifier) is compared to a different region to determine if it terminated a previous request stream. If yes, the process moves to block 570, and the number of cache lines prefetched is divided by the number of cache lines fetched that are greater than those prefetched. This value is then checked to see if less than a predetermined fraction. If less than the predetermined fraction, the process moves to block 585. A warning is presented that there maybe potential design bottlenecks such as cache size. In block 570, if the result is no, the process moves to block 590 and ends.

In block 560, if the result is no, the process moves to block 565, where all cache lines from the first cache line address to the highest cache line address are checked to see if accessed. If all line have been accessed, the process moves to block 570. Otherwise, the process moves to block 575 and the process is checked to see if at the end of simulation. If simulation is ended, the process returns to block 415 (FIG. 4). If the simulation is not ended, the process moves to block 580, and an error flag is set to indicate all prefetches did not occur (under prefetch).

The method stresses the following corner cases, since design flaws tend to be more likely in the boundary conditions: (1) fetch request stream crosses at least one block boundary; (2) prefetch depth crosses a block boundary while the read request made by the agent does not; (3) the lines explicitly read by an agent ends on a block boundary with a prefetch depth requested; (4) the last prefetch ends on a block boundary; and (5) the random case.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for verifying a prefetch mechanism in a computer system having a main memory, a cache memory and a cache controller comprising the steps:
    identifying an agent coupled to the computer system;
    determining a prefetch depth and a block boundary for the agent;
    stimulating the agent to generate a request stream to access the main memory;
    determining a depth and block boundary of data to prefetch in response to the request stream; and
    comparing the depth and block boundary of the prefetched data to the determined prefetch depth and block boundary of the agent.

2. The method of claim 1, further comprising:
    if the depth of the prefetched data exceeds the determined prefetch depth of the agent, setting a first error flag.

3. The method of claim 1, further comprising:
    if the block boundary of the prefetched data exceeds the determined block boundary of the agent, setting a second error flag.

4. The method of claim 1, further comprising:
    if the depth of the prefetched data is less than the determined prefetched depth of the agent, determining a cause for the prefetch being less than the prefetch depth, wherein if the cause is not due to an internal event or an external event, setting a third error flag.

5. The method of claim 1, further comprising setting a memory region in a computer main memory, wherein the agent accesses a memory line in the memory region based on the request stream, and wherein the memory region is unused by any other agent in the computer system.

6. The method of claim 5, further comprising:
    setting a size of the memory region to exceed a size of the determined block boundary for the agent.

7. The method of claim 1, further comprising:
    setting a size of the determined block boundary for the agent at 4 kilobytes.

8. The method of claim 1, further comprising, selecting a stimulus such that, in the absence of the boundary block, the cache controller would prefetch a cache line outside a section of memory that would have been enclosed by the block boundary.

9. The method of claim 1, further comprising:
    determining if the request stream is a fetch request or a prefetch request.

10. The method of claim 1, wherein the request stream is a Direct Memory Access (DMA) operation.

11. The method of claim 1, wherein the prefetch verification is executed on a simulation of the computer system.

12. The method of claim 1, wherein the prefetch or a fetch terminates a previous request stream operation.

13. The method of claim 1, wherein the cache controller provides a device identification.

14. The method of claim 1, further comprising determining a correct prefetch sequence, wherein if the prefetch sequence is incorrect, a sequence error flag is set.

15. The method of claim 1, further comprising:
    printing a warning if a number of prefetches is less than a minimum number.

16. An apparatus used to verify a prefetch mechanism in a computer system having a main memory and a cache with a cache controller, comprising:
    one or more agents coupled to the computer system;
    a memory region dedicated to verifying the prefetch mechanism;
    an observation unit coupled to the computer system, the observation unit comprising:
        a stimulus module,
        an observation and comparison module, and
        an error setting module, wherein the observation unit stimulates one of the one or more agents to access a line in the memory region and compares a resulting cache prefetch operation to a set of parameters to determine proper operation of the prefetch mechanism.

* * * * *

UNITED STATES PATENT AND TRADEMARK OFFICE
CERTIFICATE OF CORRECTION

PATENT NO.    : 6,412,046 B1
DATED         : June 25, 2002
INVENTOR(S)   : Sharma et al.

It is certified that error appears in the above-identified patent and that said Letters Patent is hereby corrected as shown below:

<u>Title page,</u>
Item [57], ABSTRACT,
Delete the current abstract and insert therefor --

Automatic verification of a cache line prefetch mechanism. The verification includes a strict definition of which cache lines should be prefetched and which cache lines should not. The verification emphasizes unusual operating conditions. A prefetch can be verified without having to access or view any internal signals or buses inside an integrated circuit chip and can be adopted in any system-level verification methodology. The verification is automated and performs strict checks on overprefetch, underprefetch, and the relative order in which fetch and prefetches must occur. --

Signed and Sealed this

Second Day of September, 2003

JAMES E. ROGAN
*Director of the United States Patent and Trademark Office*